United States Patent [19]

Hanna

[11] Patent Number: 4,831,251
[45] Date of Patent: May 16, 1989

[54] RIGHT AND LEFT-HAND SCREW THREAD OPTICAL DISCRIMINATOR

[75] Inventor: James L. Hanna, Ann Arbor, Mich.

[73] Assignee: Mectron Engineering Company, Inc., Ann Arbor, Mich.

[21] Appl. No.: 182,778

[22] Filed: Apr. 18, 1988

[51] Int. Cl.⁴ .................. G01N 9/04; G06M 7/00; H01J 40/14
[52] U.S. Cl. .................. 250/223 R; 209/929
[58] Field of Search .................. 209/557, 929; 250/223 R

[56] References Cited

U.S. PATENT DOCUMENTS 4,326,808  4/1982  Pryor et al. ............ 250/224
4,441,817  4/1984  Pryor .................. 250/227
4,506,980  3/1985  Pryor et al. ........... 250/562

Primary Examiner—David C. Nelms
Assistant Examiner—Eric F. Chatman
Attorney, Agent, or Firm—Harness, Dickey & Pierce

[57] ABSTRACT

An optical device for discriminating threaded workpiece by the handedness by their screw thread profiles. The device presents a pair of light beams which pass generally tangent to the workpiece at angularly displaced positions. The light beams are inclined to follow the helix direction of a given handedness of a workpiece. Upon axial advancement of a workpiece through the device, a chopped output from the photodetectors indicates that the handedness of the threads matches the inclination of the light beams. The oppositely threaded workpiece, however, provides a generally constant DC output. With appropriate signal processing electronics, an automatic system for discriminating workpieces by thread handedness is provided.

7 Claims, 2 Drawing Sheets

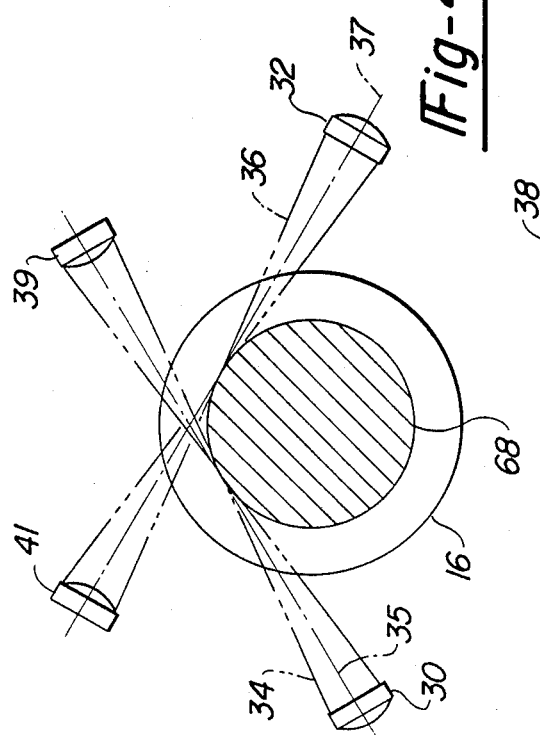
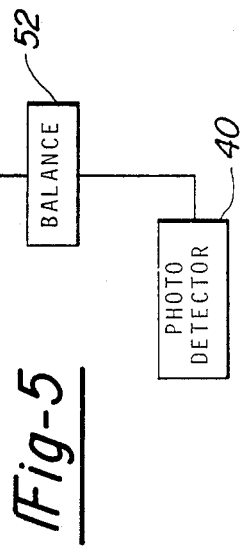
Fig-4
Fig-5

RIGHT AND LEFT-HAND SCREW THREAD OPTICAL DISCRIMINATOR

BACKGROUND AND SUMMARY OF THE INVENTION

This invention relates to an optical detection system and particularly to one adapted for discriminating between right and left-hand screw thread profiles of a threaded part.

Threaded workpieces such as bolts and screws can have either right-hand or left-hand helixes formed on them. While right-hand threads are most commonly found on threaded parts, there are many applications where left-hand threads are used. For example, the wheel mounting studs on some motor vehicles are left-hand threaded on the right-hand side of the vehicle, which has been found to reduce the tendency for wheel mounting lug nuts to loosen during use. In some settings there is a tendency for right and left-hand threaded workpieces to become intermingled, for example, in a motor vehicle mass assembly environment. In the case of wheel mounting studs, it is difficult to distinguish the two threaded profiles without carefully examining each workpiece. Obvious problems result if the incorrect handedness of a threaded workpiece is used. For example, installation of the wrong handedness of a wheel stud would interfere with lug nut installation and would become a service problem during the life of the vehicle.

Numerous systems based on optics and acoustics are presently known for evaluating the profile of screw threads. These devices, however, are generally not adapted for examining the helix direction or handedness of the threads. Accordingly, in situations where a mixture of right and left-hand workpieces tend to become intermingled, it is common to have an individual inspection operator evaluate each workpiece visually, which imposes labor costs and cycle time penalties.

In view of the foregoing, there is a need to provide an automated system for evaluating the handedness of threaded workpieces. Such a device is provided in accordance with this invention which employs a pair of light beams directed generally tangent to the workpiece at angularly displaced positions. Photodetectors sense the beams after they pass across the workpiece. When the workpieces are advanced axially, outputs unique to each handedness of thread are provided, and thus a means for distinguishing between them is provided.

Additional benefits and advantages of the present invention will become apparent to those skilled in the art to which this invention relates from the subsequent description of the preferred embodiments and the appended claims, taken in conjunction with the accompanied drawings.

BRIEF DESCRIPTION OF THE DRAWINGS

FIG. 4 is a diagrammatic sectional view showing the relative positioning of the light beams of the discriminator device passing across the workpiece profile.

FIG. 5 is a diagrammatic view of the signal processing and outputting subsystems of the discriminator device according to this invention.

DETAILED DESCRIPTION OF THE INVENTION

Figure 1:
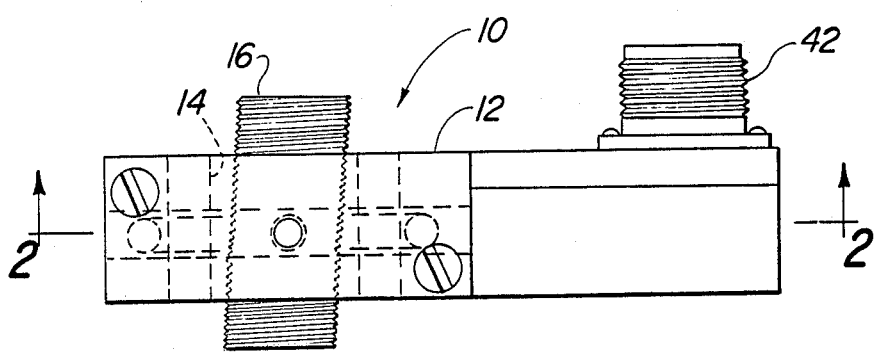
FIG. 1 is a top view of an optical discriminator according to this invention shown with an exemplary workpiece in a position for evaluation.
Figure 2:
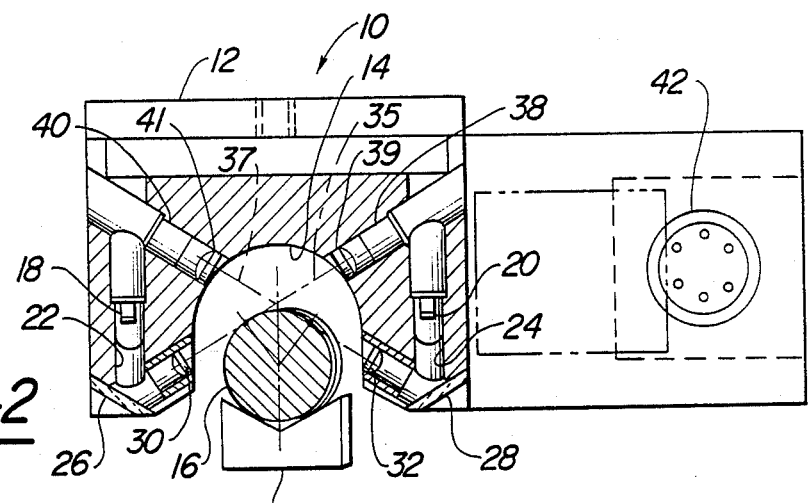
FIG. 2 is a cross-sectional view of the device shown in FIG. 1 taken along line 2—2.

A right and left-hand screw thread optical discriminator device in accordance with this invention is shown by FIGS. 1 and 2, and is generally designated by reference number 10. As shown, device 10 includes an elongated housing 12, forming a cut-out test section area 14 which receives a threaded workpiece 16. A pair of photo emitters such as LEDs 18 and 20 are mounted within bores 22 and 24, respectively, and provide light beams 34 and 36 having optical axes 35 and 37, respectively. Lenses 30 and 32 receive the beams after they are reflected off mirrors 26 and 28 from LEDs 18 and 20, and focus them at a point generally tangent to workpiece 16. Photodetectors 38 and 40 sense light beams 34 and 36 after they have passed through lenses 39 and 41. Conductors (not shown) for energizing LEDs 18 and 20, and for transmitting the outputs from photodetectors 38 and 40 communicate with electrical connector assembly 42.

Figure 3:
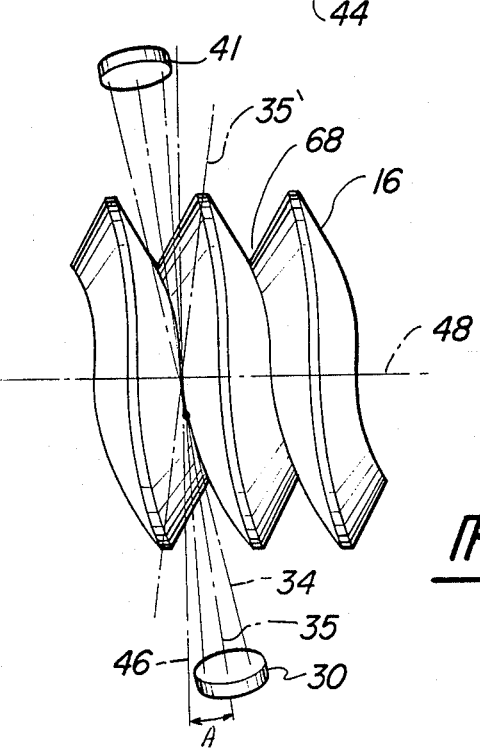
FIG. 3 is an enlarged pictorial view showing the threaded contour of a workpiece and showing the inclination of a light beam passing across the threaded profile.

FIG. 3 illustrates the manner in which light beam 34 is inclined from a plane 46 normal to longitudinal axis 48 of workpiece 16. Light beam 36 is similarly inclined, but is not shown in this figure. The extent of the beam angular deviation is designated by angle A, and approximates the helix angle of the workpiece threads for a designated handedness of threads. As shown in FIG. 3, light beam optical axis 35 is inclined to follow the helix of a right-hand threaded workpiece. As will be evident from the following description, light beams 34 and 36 would be angled to follow the helix of a left-hand threaded workpiece with equal success. Such an alternate embodiment is designated in FIG. 3 by light beam 35'.

With reference to FIG. 4, it is shown that optical axes 35 and 37 are displaced such that they are generally tangent to workpiece 16 at angularly displaced positions, as represented by angle B shown in the figure. Light beams 34 and 36 are focussed within the root 68 of the threaded profile, as shown in FIGS. 3 and 4. Angle B is non-critical except that some displacement is necessary for proper operation of discriminator device 10. Also, beams 34 and 36 are longitudinally offset slightly so that they follow the helix advancement over the displacement angle B.

In operation, workpiece 16 is advanced along its longitudinal axis 48 through test section 14. If the workpiece is threaded in the same direction as the inclination angle of optical axes 35 and 37 (i.e., designated handedness), then at various points of the longitudinal positioning of workpiece 16, photodetectors 38 and 40 will both receive light along light beams 34 and 36. In other words, at these positions, the points of tangency of optical axes 35 and 37 can be said to define the ends of a line which is a section of a helix which lies along workpiece thread root 68. At other axial positions of workpiece 16 (between the positions mentioned above), both light beams 34 and 36 are interrupted since the helical line is occluded by the projecting threads. Accordingly, if workpiece 16 is threaded in the direction of the inclinations of optical axes 35 and 37, longitudinal movement of the workpiece will produce a pulsating, in-phase output from both photodetectors 38 and 40. If an oppositely threaded workpiece (non-designated threads) is passed through device 10, the helical line described above will be interrupted at all longitudinal positions by the threaded profile, since the helical line crosses the threads and does not follow the helix direction of the threads. Accordingly, longitudinal advancement of such a "wrong" handed workpiece will not produce a pulsating output, but would rather be a generally constant output with perhaps some degree of ripple interposed thereon due to diffraction effects. By using suitable signal processing electronics such as that described below, a system can be operated to automatically sort workpieces by the handedness of their threads.

In order to properly position workpiece 16 with respect to light beams 34 and 36, a suitable locating device such as a "V" gage block 44 is needed (not shown). Such a positioning device would be selected or adjusted for a specific pitch diameter of a given type of workpiece.

FIG. 5 provides a representative schematic diagram of circuit 50 showing one approach toward handling the outputs from photodetectors 38 and 40, and discriminating workpieces by the handedness of their threads. Balance amplifier 52 is used to contorl the output level from photodetector 40 to equalize outputs from both photodetectors to compensate for individual variations in those elements. The outputs from both photodetectors are summed at adder 54. Gain 56 and offset 58 adjustments are provided to control the range of the summed outputs to a range suitable for conventional TTL (or other types) logic, for example, between 0 and 10 VDC. Limiter 60 removes any positive spikes of the signals. Meter 62 is provided for set-up and calibration of the system, and could be one of numerous types such as a digital meter or a LCD bar graph meter. The outputs from limiter 60 are also transmitted to a pair of comparators 64 and 66. Comparator 64 is set at a low threshold voltage level, for example, one volt, and provides an output representative of whether the input signal is either greater than or less than that threshold. Similarly, comparator 66 provides an output indicative of whether the received signal is above or below its threshold which is set at a higher level, for example, 4 volts. Logic gate 70 provides one logic output indicating that the received signal is either below the threshold of comparator 64, or above the threshold of comparator 66. The opposite logic output occurs when the received signal is between the thresholds of comparators 64 and 66.

In operation, when the handedness of workpiece 16 matches the inclination of light beams 34 and 36, the summed outputs from photodetectors 38 and 40 will be an interrupted DC output which swings from a high value above the threshold of comparator 66, to a low value below the level of comparator 64, thus providing a given logic output. If, however, the opposite handed thread workpiece is positioned within device 10, a generally constant DC output will result which lies between the thresholds of comparators 64 and 66, and would thus provide the opposite logic output. Logic 70 may also provide a means for ignoring a predetermined number of pulses in received signal which could occur during initial loading of a workpiece. Accordingly, the circuit provides a logic output which discriminates between the handedness of the threads. Another approach toward processing the signals would be to filter out the DC component from the signals from adder 54 and measure the peak-to-peak AC strength, with a high level signal indicating the designated handedness of threads and a low signal indicating the non-designated threads.

While the above description constitutes the preferred embodiments of the present invention, it will be appreciated that the invention is susceptible to modification, variation and change without departing from the proper scope and fair meaning of the accompanying claims.

I claim:

1. A system for discriminating between right and left-hand threaded workpieces, comprising;
   a workpiece support for positioning said workpiece,
   first and second light emitting means for presenting first and second light beams which are oriented to pass adjacent and generally tangent to a threaded portion of said workpiece at angularly displaced points, said light beams further inclined at the helix angle of a designated one of either said right or said left-hand threads of said workpiece,
   first and second light detecting means for receiving said first and second light beams respectively after passing adjacent said workpiece, and outputting signals proportional to the light incident thereon, and
   displacement means for causing relative longitudinal displacement between said workpiece and said light beams whereby a varying output from said light detecting means indicates the presence of a workpiece having said designated threads, and a generally constant output from said detecting means indicates a workpiece having the opposite of said designated threads.

2. A system according to claim 1 wherein said workpiece support comprises a "V" block.

3. A system according to claim 2 wherein said displacement means moves said workpiece longitudinally along said "V" block.

4. A system according to claim 1 further comprising signal processing means for indicating the presence of said varying output or said generally constant output.

5. A system according to claim 4 wherein said signal processing means comprises an adder for summing the outputs from said photodetectors.

6. A system according to claim 5 wherein said signal processing means further comprises a first comparator providing outputs indicating whether the received signal is greater or less than a first threshold, and a second comparator providing outputs indicating whether the received signal is greater or less than a second threshold which is greater than said first threshold, and further comprising a logic element providing an output indicating that the outputted signal is either below said first threshold or above said second threshold indicating said designated threads, and another output indicating that the outputted signal is between said thresholds, indicating said opposite of said designated threads.

7. A system according to claim 1 wherein said light beams are focused at a point between the root of said threads and their outer edge.

* * * * *